United States Patent

[11] 3,549,970

| [72] | Inventor | Alexander J. Lewus<br>9844 N. Eleventh Ave., Phoenix, Ariz. 85021 |
|---|---|---|
| [21] | Appl. No. | 692,195 |
| [22] | Filed | Dec. 20, 1967 |
| [45] | Patented | Dec. 22, 1970 |

[54] SINGLE-PHASE MOTOR CONTROLS WITH COMBINATION OVERLOAD PROTECTOR AND STARTING SWITCH
7 Claims, 4 Drawing Figs.

[52] U.S. Cl. .................................................. 318/221, 317/13; 318/227
[51] Int. Cl. ..................................................... H02p 1/44
[50] Field of Search............................................ 318/220, 221, 221.6, 227; 317/13

[56] References Cited
UNITED STATES PATENTS

| 3,132,003 | 5/1964 | Pet et al. | 318/221 |
| 3,167,699 | 1/1965 | Renaud | 318/221 |
| 3,213,239 | 10/1965 | Bodge | 318/221 |
| 3,226,620 | 12/1965 | Elliot et al. | 318/221 |
| 3,305,715 | 2/1967 | Stenger | 318/221 |
| 3,307,093 | 2/1967 | Wright | 318/221 |
| 3,414,789 | 12/1968 | Prouty | 318/227 |
| 3,071,717 | 1/1963 | Gordon | 318/221 |
| 3,071,719 | 1/1963 | Latter | 318/221.6 |
| 3,116,445 | 12/1963 | Wright | 318/220 |
| 3,376,484 | 4/1968 | Lewus | 318/221 |

OTHER REFERENCES

Lewus Electric Company Circular No. 19 Copyright 1966 by Lewus Electric Company (2 copies attached)

*Primary Examiner*—Oris L. Rader
*Assistant Examiner*—K. L. Crosson
*Attorney*—Kinzer, Dorn and Zickert ABSTRACT: Control circuits for single-phase electric motors of the split-phase, capacitor-start inductance-run, and capacitor-start capacitor-run kinds in which the starting winding is connected to a power supply through a circuit including one or more unitary signal-controlled bidirectional gate devices, in which a thermal overload protector is incorporated in a sensing circuit that actuates the gate device or devices. Thus, the overload protector constitutes an integral operating part of the starting switch circuit for the motor.

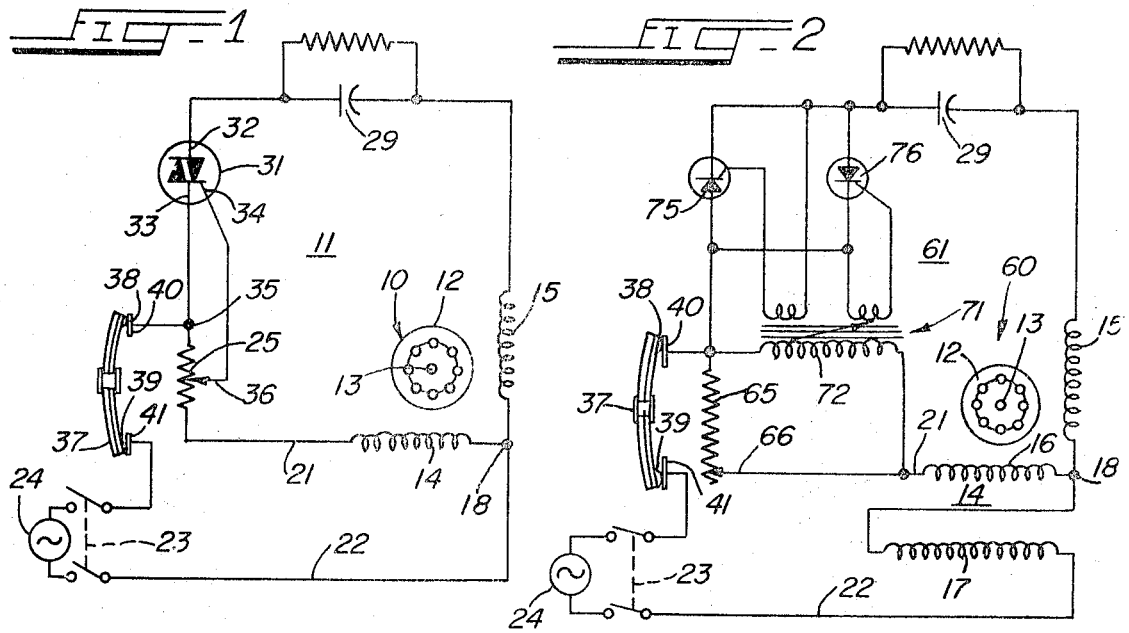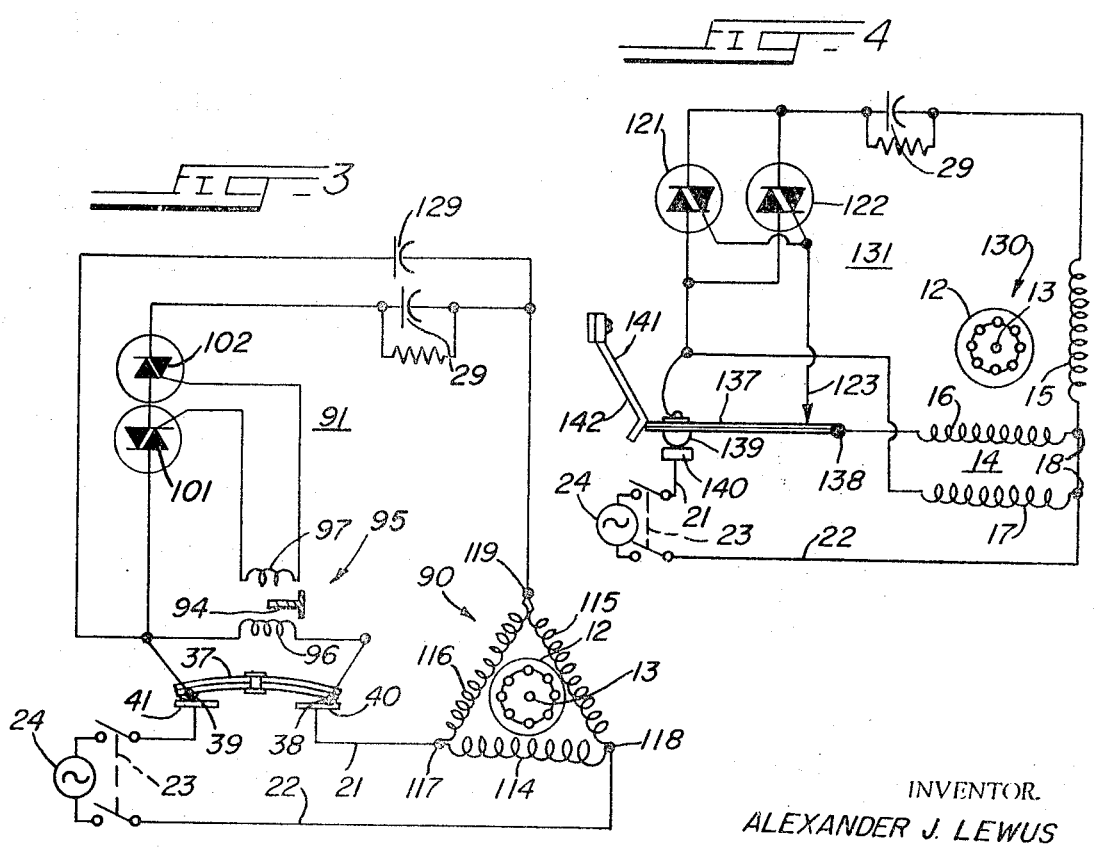

SINGLE-PHASE MOTOR CONTROLS WITH COMBINATION OVERLOAD PROTECTOR AND STARTING SWITCH

CROSS REFERENCE TO RELATED APPLICATION

The invention embodied in this application is an improvement on the control circuits of application Ser. No. 666,269 filed Sept. 8, 1967.

BACKGROUND OF THE INVENTION

This invention relates to single-phase motors and more particularly to controls for the starting windings of single-phase electric motors of the split-phase, capacitor-start capacitor-run and capacitor-start inductance-run kinds.

Single-phase electric motors are conventionally provided with two windings, mounted in a stator core, inductively coupled to the rotor of the motor. These two windings, constituting a starting winding and a running winding, are angularly displaced from each other, within the stator core, the construction being such that the starting winding is supplied with a leading current that is displaced by 60° or more electrically with respect to the lagging current in the main winding of the motor. The starting winding is used primarily for starting of the motor. Most frequently, a centrifugally operated switch driven by the motor shaft is used to disconnect the starting winding after the motor has reached a given speed. In some motors, the starting winding may remain coupled to the power supply through a fixed running capacitor.

In the operation of conventional single-phase electric motors, whether of the capacitor-start inductance-run, capacitor-start capacitor-run, or split-phase types, one of the most frequent sources of malfunction is the centrifugal switch or other switching device used to disconnect the starting winding from the electrical circuit when the motor is running. If the motor is started and stopped quite frequently, the switch or relay contacts may arc excessively and may deteriorate to a point where the motor will not function properly even though the motor structure itself is good for a much longer life. The switch or relay also may accumulate dust, dirt, and other materials and may eventually jam, preventing effective starting or tending to maintain the starting winding of the motor in circuit after it should be disconnected. In the latter circumstance, the motor may overheat, substantially reducing the life of the motor. Furthermore, the conventional control arrangements for single-phase motors frequently produce substantial difficulties with respect to reversing the direction of rotation of the motor, particularly when the direction of rotation is reversed under load conditions.

Throughout this specification, and in the appended claims, the expression "capacitor-start motor" includes both capacitor-start capacitor-run motors and capacitor-start inductance-run motors.

There have been proposals for the use of signal-controlled rectifiers in the starting circuits of single-phase electric motors in place of conventional starting switches. Thus, in U.S. Pat. No. 3,116,445, two sensing windings are inductively coupled to the main winding of a capacitor-start inductance-run motor, the outputs from the sensing windings being used to trigger two SCRs connected in back-to-back relation in series in the starting winding circuit of the motor. And similar circuits, each using a separate sensing transformer having a primary winding connected in the main motor winding circuit, are shown in U.S. Pat. Nos. 3,226,620 and 3,071,717. But the circuits proposed in those patents present substantial difficulties with respect to maintenance of adequate sensitivity and accuracy of operation, primarily due to the utilization of substantial resistance, capacitance, or both in the triggering circuits for the SCRs. Moreover, these known circuits, in which the firing levels of the SCRs are controlled by added impedances in their trigger circuits, tend to afford relatively low starting torques in operation of the motors.

Many of the difficulties and disadvantages of previously seen starting circuits for single phase electric motors are effectively and inherently minimized by the starting circuits disclosed in the aforementioned application Ser. No. 666,269 filed Sept. 8, 1967. The starting circuits disclosed in that application each include at least one bidirectionally conductive semiconductor gate device that is connected in series in the starting circuit with a gate electrode conductively connected to a sensing element, usually a resistor, inductor, or sensing transformer, that is in series with the main winding of the motor. The gate device is triggered to conduction whenever the load current to the main winding of the motor exceeds a first threshold amplitude. The gate device cuts off whenever the load current falls below a second threshold amplitude, which may be substantially coincident with the first threshold amplitude. In the preferred starting circuits disclosed in that application, direct conductive connections are employed between the sensing means and the gate electrode of the gate device. However, the starting or control circuit does not provide overload protection for either the motor or the gate device.

SUMMARY OF THE INVENTION

It is a principal object of the present invention, therefore, to provide a new and improved control circuit for single-phase electric motors, utilizing one or more bidirectional semiconductor gate devices as starting switches, in which overload protection for the motor and the gate device or devices is incorporated in and constitutes an integral part of the control circuit.

A further object of the invention is to provide a combined starting control circuit and overload protector for a single-phase motor that is small is size, low in cost, and positive in action.

Accordingly, the invention is directed to a control circuit for a single-phase electric motor including a main winding and a starting winding angularly disposed from each other in a stator core and both inductively coupled to a rotor. The control circuit of the invention comprises power circuit means for connecting the main winding to a single-phase power supply together with sensing means coupled to the power circuit means for developing a control signal proportional to the load current in the main winding of the motor. The control circuit further includes starting circuit means for connecting the starting winding of the motor to the power supply. This starting circuit means includes at least one bidirectional conductive semiconductor gate device having input and output electrodes connected in series in the starting circuit and having a gate electrode conductively connected to the sensing means. The sensing means is an integral part of a thermal overload protector comprising a thermally actuated switch connected in series with both the main and starting windings of the motor; the sensing means, however, is not in series with the starting winding. The thermal overload switch protects both the gate device and the motor windings against excessive thermal conditions, based upon the current drawn by the main winding of the motor.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

BRIEF DESCRIPTION OF THE DRAWINGS

FIG. 1 is a schematic diagram of a single phase single voltage capacitor-start inductance-run motor connected in a control circuit constructed in accordance with one embodiment of the present invention;

FIG. 2 is a schematic diagram of a dual voltage capacitor-start inductance or un motor connected in a control circuit constructed in accordance with another embodiment of the invention;

FIG. 3 is a schematic illustration of a capacitor-start capacitor-run motor having three-phase windings but operated single-phase and connected in a control circuit comprising an additional embodiment of the invention; and FIG. 4 is a schematic diagram of a dual voltage capacitor-start inductance-run motor connected in a control circuit according to another embodiment of the present invention.

DESCRIPTION OF THE PREFERRED EMBODIMENTS

FIG. 1 illustrates, in schematic form, a capacitor-start inductance-run motor 10 of generally conventional construction connected in a control circuit 11 comprising one embodiment of the present invention. The motor 10 includes an armature 12; the armature may be of a high resistance or a low resistance type. Thus, armature 12 may be constructed with individually wound wire coils mounted in slots in the usual laminated core structure; it may equally well comprise die cast conductors instead of wire coils. Armature 12 is mounted upon the usual motor shaft 13.

Motor 10 further includes a main or running winding 14 and a starting winding 15. These two windings are connected together at a terminal 18.

The main winding 14 of motor 10 is connected to a single-phase power supply 24 by power circuit means comprising a pair of conductors 21 and 22 and a main switch 23. Power supply 24 represents any conventional AC power supply. Switch 23 is shown as a conventional double-pole single-throw motor switch. Switch 23 may constitute a suitable electrically operated contactor if desired.

The control circuit 11 of FIG. 1 further includes a combination sensing device and overload heater comprising a resistor 25 that is connected in series in the one conductor 21 that connects the AC power supply to the main running winding 14 of the motor. As a sensing device, resistor 25 develops a control signal voltage that is proportional to the amplitude of the current in conductor 21 and hence is representative of the load current drawn by the main winding 14 of the motor. Resistor 25 also is heated to a degree proportional to the heating of the main winding of the motor as described more fully hereinafter.

A principal control element in circuit 11 is a triac 31 having input and output electrodes 32 and 33 and a gate or trigger electrode 34. Electrode 32 is connected to the end of starting winding 15 opposite terminal 18 by a circuit that includes a starting capacitor 29. Electrode 33 is connected to the terminal 35 of resistor 25 opposite the connection of the resistor to winding 14. Gate electrode 34 is connected to an adjustable tap 36 on resistor 25. Triac 31 may be replaced by other bidirectionally conductive semiconductor gate devices such as those referred to commercially as "quadracs."

Control circuit 11 further includes a bimetallic disc or other similar thermally sensitive switch member 37. The bimetal disc 37 has two contacts 38 and 39 which normally engage two fixed contacts 40 and 41, respectively. Fixed contact 40 is electrically connected to the terminal 35. Fixed contact 41 is connected to the main switch 23. Thus, the bimetal overload member 37 is electrically connected in series between the power supply 24 and the sensing resistor 25 and is also connected in series between the power supply and the input electrode 33 of gate device 31.

To start motor 10, switch 23 is closed, connecting main winding 14 in series across AC supply 24. The initial inrush of starting current through sensing resistor 25 develops a substantial voltage drop across its terminals 35 and 36, a signal of sufficient amplitude to trigger gate device 31 to conduction. Thus, starting winding 15 is initially effectively connected in a complete starting circuit, through the bidirectional signal controlled rectifier 31, to the same power supply that energizes the main winding 14 of the motor.

As motor 10 builds up in e.m.f. and approaches running speed, the current drawn by its running winding 14 progressively reduces. When the current through resistor 25 in the main motor power circuit drops below a given threshold value, the voltage drop across terminals 35 and 36, as applied to electrodes 33 and 34, is no longer sufficient to maintain the gate device 31 conductive. Since the current in the main discharge path between electrodes 32 and 33 of device 31 goes to zero in each cycle of the supply current, the gate device ceases to conduct and the starting circuit comprising capacitor 29 and starting winding 15 are cut out of the circuit.

During continuing operation of the motor, if short term excessive load conditions are encountered the current in the main power circuit 21, 22 for the running winding 14 of the motor may again become high enough to develop a control voltage across the terminals 35 and 36 of the sensing resistor 25 having an amplitude sufficient to again trigger gate device 31 to its conductive condition. When this occurs, starting winding 15 is again connected in the circuit until such time as the load current through the running winding 14 drops below the threshold amplitude required to produce a voltage drop across terminals 35 and 36 sufficient to trigger gate device 31 to conduction. In the latter circumstance, motor 10 again maintains operation with only running winding 14 energized.

In normal operation of motor 10, the overload device comprising bimetal disc 37 remains in closed condition with contact pairs 38, 40 and 39, 41 closed. The bimetal disc is heated by resistor 25 but does not reach a temperature high enough to disengage its contacts from the fixed contacts 40 and 41. If the motor is stalled, however, disc 37 is heated much more rapidly; typically, if the voltage drop across resistor 25 is of the order of 0.6 volts for starting or stalled operating conditions, it is only approximately 0.25 volts for normal running conditions. Heating of disc 37 under stalled conditions causes the bimetal or other thermally responsive material of the disc to snap the disc from its normal concave configuration as shown in FIG. 1 to a straightened condition, opening the contact pairs 38, 40 and 39, 41. The opening of these contacts deenergizes motor 10 since the circuit comprising circuit 21 is now open.

The overload device comprising disc 37 can also be actuated to open condition by operation of motor 10 under excessive load conditions that do not stall the motor. Thus, motor 10 may maintain operation over an extended period of time under an overload that ultimately causes the heat from resistor 25 to heat disc 37 to an extent sufficient to straighten the disc and open its contacts. Excessive ambient heat conditions, coupled with the operation of heater 25 can also cause the overload device to open the operating circuit to the motor. Furthermore, if the overload device is maintained within the motor closure, a failure of motor ventilation can produce the same result.

From the foregoing description, it will be apparent that resistor 25 functions as an integral part of the starting circuit for motor 10 and also performs an equally important function in actuation of the overload protector for the motor. Tap 36 can be adjusted to assure protection for the motor in relation to its thermal capacity. Alternatively, the tap can be adjusted to provide primary protection on the basis of the thermal and electrical properties of gate device 31 if these are more critical then the corresponding requirements for the motor. The combined starting circuit control and overload protection apparatus afforded by circuit 11 is quite small in size and is low in cost in comparison with separate starting control and overload protection devices.

FIG. 2 illustrates a control circuit 61 that is generally similar to the circuit 11 of FIG. 1, in many respects, but that includes a number of variations and constitutes another embodiment of the present invention. The motor 60 shown in FIG. 2 is a dual voltage motor comprising a squirrel cage armature 12 mounted upon a shaft 13 and inductively coupled to a starting winding 15 and a running winding 14. In this instance, the main or running winding 14 comprises two winding sections 16 and 17 connected in series at the terminal 18 to which starting winding 15 is connected. The connection shown is for high voltage operation. For low voltage operation, winding sections 16 and 17 would be reconnected in parallel with each other. The basic power circuit for the running winding 14 is the same as in FIG. 1 and comprises the conductors 21 and 22 connected through a starting switch 23 to a suitable single-phase AC power supply 24.

The power circuit for main winding 14, in control circuit 61, again includes, in series with conductor 21, a heating resistor 65 connected in series with a bimetal overload device 37. In this instance, resistor 65 is provided with an adjustable tap 66 that is connected to the conductor 21 leading to main winding 14.

The control circuit 61 further includes a sensing transformer 71 having a primary winding 72 that is connected in parallel with resistor 65 and hence constitutes a part of the power circuit forming winding 14. Sensing transformer 71, which includes an adjustable iron core, has two secondary windings 73 and 74.

The starting circuit incorporated in control circuit 61 comprises two signal-controlled rectifiers 75 and 76. The anode of rectifier 75 is connected to the common terminal 67 for the sensing transformer primary winding 72 and the overload heater resistor 65. The cathode of rectifier 75 is connected to starting winding 15 through a starting capacitor 29. The secondary winding 73 of transformer 71 is connected between the gate electrode and the cathode of rectifier 75.

A similar circuit but of reverse polarity is employed for rectifier 76. Thus, the anode of this rectifier is connected through capacitor 29 to starting winding 15 of motor 60. The cathode of rectifier 76 is connected to terminal 67. The remaining secondary winding 74 of sensing transformer 71 is connected across the gate electrode and the cathode of rectifier 76.

In general, operation of control circuit 61, FIG. 2, is similar to that of control circuit 11 (FIG. 1) as discussed above. For normal starting conditions, upon closing of switch 23, the inrush of starting current to the motor produces an output signal from sensing transformer 71 which triggers rectifier 75 to conduction of alternate half-cycles. Similarly, rectifier 76 is driven conductive on each half-cycle that rectifier 75 is cut off. Accordingly, a full wave rectified current is supplied to starting winding 15 so long as the output signals from the secondary winding 73 and 74 of transformer 71 are of sufficient amplitude to gate the rectifiers 75 and 76 to conductive condition.

When running conditions are reached, the output signals from the sensing transformer 71 are no longer adequate in amplitude to drive the rectifiers 75 and 76 to conduction. Under these conditions, only the main running winding 14 of the motor is energized.

Under all operating conditions, resistor 65 produces a heat output that is proportional to the current drawn by the main winding 14 of the motor and hence to the temperature of the motor windings. Under stalled conditions or under continuing overload conditions, the heat from resistor 65 causes the bimetal overload member 37 to straighten, opening its contacts 38, 40 and 39, 41. It is thus seen that the device 37 and resistor 65, incorporated directly in the input and control circuit for motor 60, afford effective protection for the motor against excessive overload, blocked ventilation, and like conditions.

FIG. 3 illustrates an additional embodiment of the invention in which a three-phase motor 90, operated as a single-phase motor, is controlled by a control circuit 91. Motor 90 includes a wound rotor or squirrel cage rotor 12 mounted upon a shaft 13 with the rotor windings inductively coupled to three stator windings 114, 115 and 116. The stator windings are shown in a delta connection with windings 114 and 115 connected together at a terminal 118, windings 114 and 116 connected together at a terminal 117, and windings 115 and 116 connected at a terminal 119. Terminals 117 and 118 are connected to the power line conductors 21 and 22, respectively.

Conductors 21 and 22 are connected back through a starting switch 23 to a power supply 24. A Y-connection could also be used for motor 90.

In FIG. 3, motor 90 is arranged for capacitor-start capacitor-run operation. An intermittent-duty starting capacitor 29 is connected in series with the control circuit 91 between the motor winding terminal 119 and the power supply conductor 21. In addition, a continuous-duty running capacitor 129 is connected from terminal 119 back to conductor 21 in parallel with starting capacitor 29 and control circuit 91.

In control circuit 91, a thermally actuated overload protection device 37 is connected in series in the power line conductor 21. The construction of the overload protector 37 is essentially the same as described above and as illustrated in FIGS. 1 and 2. In the circuit of FIG. 3, however, the connection to the gating circuit of control circuit 91 is somewhat different.

Thus, control circuit 91 includes a sensing transformer 95 comprising a primary winding that is connected between the contacts 38 and 39 of the overload protection device 37. Transformer 95 is basically an air core transformer but has a magnetic core 94 that can be advanced partially into the transformer to adjust the coupling between the primary winding 96 and a secondary winding 97.

Control circuit 91 further includes two triacs 101 and 102 that are connected in series with starting capacitor 29, the two triacs being in series with each other. The gate electrodes for devices 101 and 102 are connected to the end terminals of the secondary winding 97 of sensing transformer 95. The connection to the gate electrodes of the triacs is such that each is rendered conductive in each half-cycle of the AC supply. It should be noted that the power supply connections for both of the capacitors 29 and 129 are completed through contact 39 of the overload protector 37.

The operation of control circuit 91, FIG. 3, is essentially similar to the circuits described above in connection with FIGS. 1 and 2. In normal operation, the thermal overload device 37 remains in the illustrated closed circuit condition. The principal flow of current to motor 90, through conductor 21, is through the primary winding 96 of sensing transformer 95. A part of the current, however, flows through the thermal overload device, heating that device in proportion to the load current drawn by the motor. Switching of the starting capacitor 29 into and out of the motor circuit is effected by the two triacs 101 and 102 under the control of the output signal from the secondary winding 97 of sensing transformer 95.

Under excessive stalling or overload conditions, or in the event of a blockage of ventilation to the motor, the thermal disc of device 37 reaches a temperature such that the disc snaps to its alternate position, opening its contacts 38, 40 and 39, 41. Under these circumstances, the motor can no longer operate, and overheating of the motor and the triacs is prevented.

FIG. 4 shows a control circuit 131 constituting another embodiment of the present invention, particularly useful with larger motors. The motor 130 in FIG. 4 is again a dual-voltage motor comprising a squirrel cage armature 12 on a shaft 13 with the armature inductively coupled to a starting winding 15 and to a running winding 14 that includes two winding sections 16 and 17. The motor 130 is shown in the low voltage connection with all three of the windings connected together at a common terminal 18. The power circuit again comprises the conductors 21 and 22 connected through a starting switch 23 to an appropriate power supply 24.

Control circuit 131 includes two triacs 121 and 122; quadracs or other similar control semiconductor gate devices can be used if desired. In this circuit, however, the triacs are connected in parallel with each other rather than in the series configuration employed in FIG. 3.

Control circuit 131 further includes an overload protection device 137 that is somewhat different from the overload devices described in conjunction with FIGS. 1—3. Device 137 includes a bimetal strip having a fixed terminal 138 that is connected to section 16 of the main winding 14 of motor 130. At the opposite end of the bimetal strip from terminal 138 there is a movable terminal 139 that normally engages a fixed contact 141. Contact 139 is directly electrically connected to the other section 17 of the main winding for the motor, bypassing the bimetal strip. Contact 139 is also connected to the input electrodes of the two triacs 121 and 122 with the output electrodes of those devices being connected to a starting capacitor 29 that is in turn connected to the starting winding 15 of the motor.

A spring 141 is disposed immediately adjacent the free end of the bimetal strip 137. Spring 141 is employed to prevent automatic restoration of an operating circuit for the motor following an overload condition, as described more fully hereinafter. Control circuit 131 is completed by an electrical connection from the gate electrodes by each of the triacs 121 and 122 to a movable tap 123 on the bimetal strip 137.

Normal operation of control circuit 131, FIG. 4, is essentially the same as for FIGS. 1—3. Closing of switch 23 energizes the main winding 14 of the motor. The inrush of starting current to section 16 of the main motor winding produces a voltage drop across the bimetal strip 137 which triggers devices 121 and 122 to conductive condition, completing a starting circuit through capacitor 29 to winding 15. As the motor reaches running conditions, the voltage drop across the bimetal strip decreases to a level in which the gate devices are cut off, effectively cutting off the starting winding out of the circuit. Tap 123 can be adjusted to the desired current level for switching of the gate devices 121 and 122.

Under conditions of excessive overload, loss of ventilation, or repeated stalling, the bimetal strip 137 heats up to an extent sufficient to cause the strip to bend upwardly from its illustrated position, opening contacts 139 and 141. This operation of the overload protector effectively disconnects the complete motor circuit from the power supply so that no damage can be sustained by either the motor or the gate devices in the control circuit. The upward movement of the bimetal strip brings its tip end above the knee portion 142 of spring 141. Consequently, spring 141 prevents reclosing of the circuit when the bimetal subsequently cools to a temperature at which it would normally reengage its contact 139 with the fixed contact 141. Thus, a manual reset is required.

In each of the embodiments of the invention, as described above, the overload protector serves a dual purpose, protecting both the motor and the gating circuit for the starting winding or windings of the motor. In each embodiment of the invention the bimetal or other thermally sensitive switching device is an integral part of the control circuit and the heater element of the overload switch constitutes a part of the sensing apparatus used to control energization of the starting winding of the motor. The combination of overload protection and starting control results in a compact unit that is economical to manufacture yet positive and efficient in operation.

Hence, while preferred embodiments of the invention have been described and illustrated, it is to be understood that they are capable of variation and modification.

I claim:

1. A control circuit for a single-phase electric motor of the split phase or capacitor-start kinds, including a main winding and a starting winding angularly displaced from each other in a stator core and inductively coupled to a rotor, comprising:

power circuit means for connecting said main winding to a single-phase power supply;

sensing means, coupled to said power circuit means, for developing an alternating current control signal proportional to the load current to the main winding of the motor;

a starting circuit connecting said starting winding to the power supply, including at least one signal-controlled semiconductor gate device, having input and output electrodes connected in series in said starting circuit means, and having a gate electrode directly connected to said sensing means, whereby said gate electrode has said alternating current control signal applied thereto for closing said starting circuit means for full wave energization of said starting winding in response to said control signal whenever the load current to said main winding exceeds a first threshold amplitude and for opening said starting circuit means whenever the motor load current falls below a threshold amplitude; and an overload protection device, including a thermally actuated switch in series with said power circuit means and said sensing means, for disconnecting said motor and said starting circuit from said power supply under excessive temperature conditions, said overload protection device including an impedance constituting an integral part of said sensing means.

2. A control circuit for a single-phase electric motor according to claim 1 in which said impedance for said sensing means comprises an adjustable resistor connected in series in one line of said power circuit and having one terminal connected to the input electrode of said gate device and another terminal connected to the gate electrode thereof.

3. A control circuit for a single-phase electric motor according to claim 2 in which said adjustable resistor constitutes a heating element for a separate thermally actuated switching element disposed adjacent thereto.

4. A control circuit for a single-phase electric motor according to claim 2 in which said adjustable resistor constitutes a bimetal switch element connected in series in said power circuit and having a movable tap terminal connected to said gate electrode.

5. A control circuit for a single-phase electric motor according to claim 1 in which said sensing means comprises a sensing transformer having a primary winding connected in series in one line of said power circuit and in which said impedance for said sensing means comprises a resistance element connected in parallel with said primary winding.

6. A control circuit for a single-phase electric motor according to claim 5 in which said resistance element is an adjustable resistor constituting a heating element for a separate thermally actuated switching element disposed adjacent thereto.

7. A control circuit for a single-phase electric motor according to claim 5 in which said resistance element constitutes a self-heating bimetal switch element.